United States Patent
Kochi et al.

(10) Patent No.: US 11,367,312 B2
(45) Date of Patent: Jun. 21, 2022

(54) FACE AUTHENTICATION APPARATUS

(71) Applicant: NEC CORPORATION, Tokyo (JP)

(72) Inventors: Taketo Kochi, Tokyo (JP); Kenji Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 46 days.

(21) Appl. No.: 16/961,306

(22) PCT Filed: Nov. 15, 2018

(86) PCT No.: PCT/JP2018/042335
§ 371 (c)(1),
(2) Date: Jul. 10, 2020

(87) PCT Pub. No.: WO2019/138688
PCT Pub. Date: Jul. 18, 2019

(65) Prior Publication Data
US 2021/0081654 A1     Mar. 18, 2021

(30) Foreign Application Priority Data
Jan. 12, 2018    (JP) .............................. JP2018-003230

(51) Int. Cl.
*G06K 9/62*      (2022.01)
*G06V 40/16*    (2022.01)
(Continued)

(52) U.S. Cl.
CPC ............ *G06V 40/172* (2022.01); *G06F 21/32* (2013.01); *G06F 21/40* (2013.01); *G06K 9/6215* (2013.01); *G06V 10/751* (2022.01); *G06V 40/168* (2022.01)

(58) Field of Classification Search
CPC ........... G06K 9/00288–9/00295; G06K 19/07; G06K 9/00892; G06F 21/32; G06Q 20/34; G06V 40/70; G06V 40/172–40/173
See application file for complete search history.

(56) References Cited

U.S. PATENT DOCUMENTS

| | | | |
|---|---|---|---|
| 2004/0164848 A1 | 8/2004 | Hwang et al. | |
| 2015/0161370 A1 | 6/2015 | North et al. | |

(Continued)

FOREIGN PATENT DOCUMENTS

| | | |
|---|---|---|
| JP | 2001-290779 A | 10/2001 |
| JP | 2002-230553 A | 8/2002 |

(Continued)

OTHER PUBLICATIONS

Extended European Search Report for EP Application No. EP18899721.7 dated Feb. 1, 2021.
(Continued)

*Primary Examiner* — Brian Werner
(74) *Attorney, Agent, or Firm* — Sughrue Mion, PLLC (57) ABSTRACT

A face authentication apparatus includes a first authentication unit that performs first authentication on a face image of an authentication target based on a threshold, a second authentication unit that performs second authentication by an authentication method other than face authentication, a detection unit that detects use or non-use of the second authentication unit, a threshold change unit that sets a larger value to the threshold when the second authentication unit is used, compared with a value to be set when the second authentication unit is not used, and a personal authentication unit that performs personal authentication based on a result of the first authentication when the second authentication unit is not used, while performs personal authentication based on the results of the first authentication and the second (Continued)

authentication when the second authentication unit is used, with use of the threshold after the setting.

13 Claims, 8 Drawing Sheets

(51) Int. Cl.
 *G06F 21/32* (2013.01)
 *G06F 21/40* (2013.01)
 *G06V 10/75* (2022.01)

(56) References Cited

U.S. PATENT DOCUMENTS

| | | | |
|---|---|---|---|
| 2016/0063235 A1 | 3/2016 | Tussy | |
| 2018/0367542 A1* | 12/2018 | Wolf | ............... H04L 63/08 |
| 2021/0271860 A1* | 9/2021 | Han | ............... G06K 9/00288 |

FOREIGN PATENT DOCUMENTS

| | | | |
|---|---|---|---|
| JP | 2005-202730 A | 7/2005 |
| JP | 2005-207230 A | 8/2005 |
| JP | 2005-242677 A | 9/2005 |
| JP | 2008-129959 A | 6/2008 |
| JP | 2008-158627 A | 7/2008 |
| JP | 2013-117876 A | 6/2013 |
| JP | 2013-120541 A | 6/2013 |
| JP | 2016-118977 A | 6/2016 |
| JP | 2018-7036 A | 1/2018 |
| JP | 2019-125000 A | 7/2019 |
| JP | 6593466 B2 | 10/2019 |

OTHER PUBLICATIONS

Japanese Office Action for 2018-003230 dated Mar. 19, 2019.
Japanese Decision of Refusal for 2018-003230 dated, May 28, 2019.
Japanese Decision to Grant a Patent for 2018-003230 dated, Aug. 27, 2019.
Japanese Office Action for 2019-141945 dated, Jun. 10, 2020.
International Search Report for PCT/JP2018/042335 dated, Feb. 12, 2019 (PCT/ISA/210).
Japanese Office Action for JP Application No. 2020-149813 dated Oct. 5, 2021 with English Translation.

* cited by examiner

FACE AUTHENTICATION APPARATUS

CROSS REFERENCE TO RELATED APPLICATIONS

This application is a National Stage of International Application No. PCT/JP2018/042335 filed Nov. 15, 2018, claiming priority based on Japanese Patent Application No. 2018-003230, filed Jan. 12, 2018, the disclosures of which are incorporated herein in their entirety by reference.

TECHNICAL FIELD

The present invention relates to a face authentication apparatus, a face authentication method, and a program.

BACKGROUND ART

Conventionally, in various systems such as an access monitoring system and an attendance management system, personal authentication by means of face authentication is performed on a user who passes through a gate or the like. In such a system, a face authentication apparatus for performing personal authentication using both face authentication and another authentication method has been proposed and put into practice.

For example, Patent Literature 1 discloses a face authentication apparatus using both face authentication and authentication by a personal identification number (PIN). The face authentication apparatus disclosed in Patent Literature 1 first receives a PIN input by a user, and compares it with a registered PIN. When all digits of the PIN are correctly input, personal authentication succeeds without performing face authentication. When none of the PIN is input or, even if it is input, only a predetermined number of digits or smaller are correct, personal authentication fails without performing face authentication. In other cases, face authentication is performed, and success or failure of personal authentication is determined based on the result of face authentication. In that case, a threshold for face authentication is set according to the number of digits of the PIN that are correctly input. Specifically, as a larger number of digits of the PIN are correctly input, that is, as higher security strength is achieved by the PIN authentication, a smaller threshold is used for face authentication to thereby facilitate acceptance of the person.

A system in which two or more different types of authentication information are combined, like face authentication and PIN authentication, is called two-factor authentication or multi-factor authentication.

CITATION LIST

Patent Literature

Patent Literature 1: JP 2008-158627 A

SUMMARY

In a face authentication apparatus using both face authentication and another authentication method, it is considered to allow use/non-use of the other authentication method to be selectable. When another authentication method is not used, personal authentication is performed only based on the result of face authentication. Therefore, security strength is lowered but convenience is improved. On the other hand, when another authentication method is also used, personal authentication is performed based on a result of face authentication and a result of the other authentication method. Therefore, although convenience is lowered, the security strength is enhanced.

In the face authentication apparatus as described above in which operation can be switched between one placing emphasis on security and the other placing emphasis on convenience by selecting use/non-use of another authentication method, it is desirable to make the difference in the security strength between them more prominent. That is, it is desirable to expand the difference in the security strength between the operation placing emphasis on security and the operation placing emphasis on convenience. However, it is difficult to realize such an operation form by simply selecting use/non-use of another authentication method.

An exemplary object of the present invention is to provide a face authentication apparatus that solves the aforementioned problem.

A face authentication apparatus according to an aspect of the present invention includes a first authentication unit that performs first authentication on a face image of an authentication target based on a threshold, a second authentication unit that performs second authentication by an authentication method other than face authentication, a detection unit that detects use or non-use of the second authentication unit, a threshold change unit that sets a larger value to the threshold when the second authentication unit is used, compared with a value to be set when the second authentication unit is not used, and a personal authentication unit that performs personal authentication based on a result of the first authentication when the second authentication unit is not used, while performs personal authentication based on the result of the first authentication and the result of the second authentication when the second authentication unit is used, with use of the threshold after the setting.

A face authentication method including detecting use or non-use of second authentication by an authentication method other than face authentication;

when the second authentication is used, setting a larger value to a threshold of first authentication in which authentication is performed on a face image of an authentication target based on the threshold, compared with a value to be set when the second authentication is not used; and with use of the threshold after the setting, performing personal authentication based on a result of the first authentication when the second authentication unit is not used, while performing personal authentication based on the result of the first authentication and the result of the second authentication when the second authentication unit is used.

A program for causing a computer to function as a first authentication unit that performs first authentication on a face image of an authentication target based on a threshold, a second authentication unit that performs second authentication by an authentication method other than face authentication, a detection unit that detects use or non-use of the second authentication unit, a threshold change unit that sets a larger value to the threshold when the second authentication unit is used, compared with a value to be set when the second authentication unit is not used; and a personal authentication unit that performs personal authentication based on a result of the first authentication when the second authentication unit is not used, while performs personal authentication based on the result of the first authentication and the result of the second authentication when the second authentication unit is used, with use of the threshold after the setting.

With the configuration described above, the present invention is capable of expanding a difference in the security strength between the operation placing emphasis on security and the operation placing emphasis on convenience in a face authentication apparatus in which operation can be switched between them by selecting use/non-use of another authentication method.

EXEMPLARY EMBODIMENTS

Next, exemplary embodiments of the present invention will be described in detail with reference to the drawings.

First Exemplary Embodiment

Figure 1:
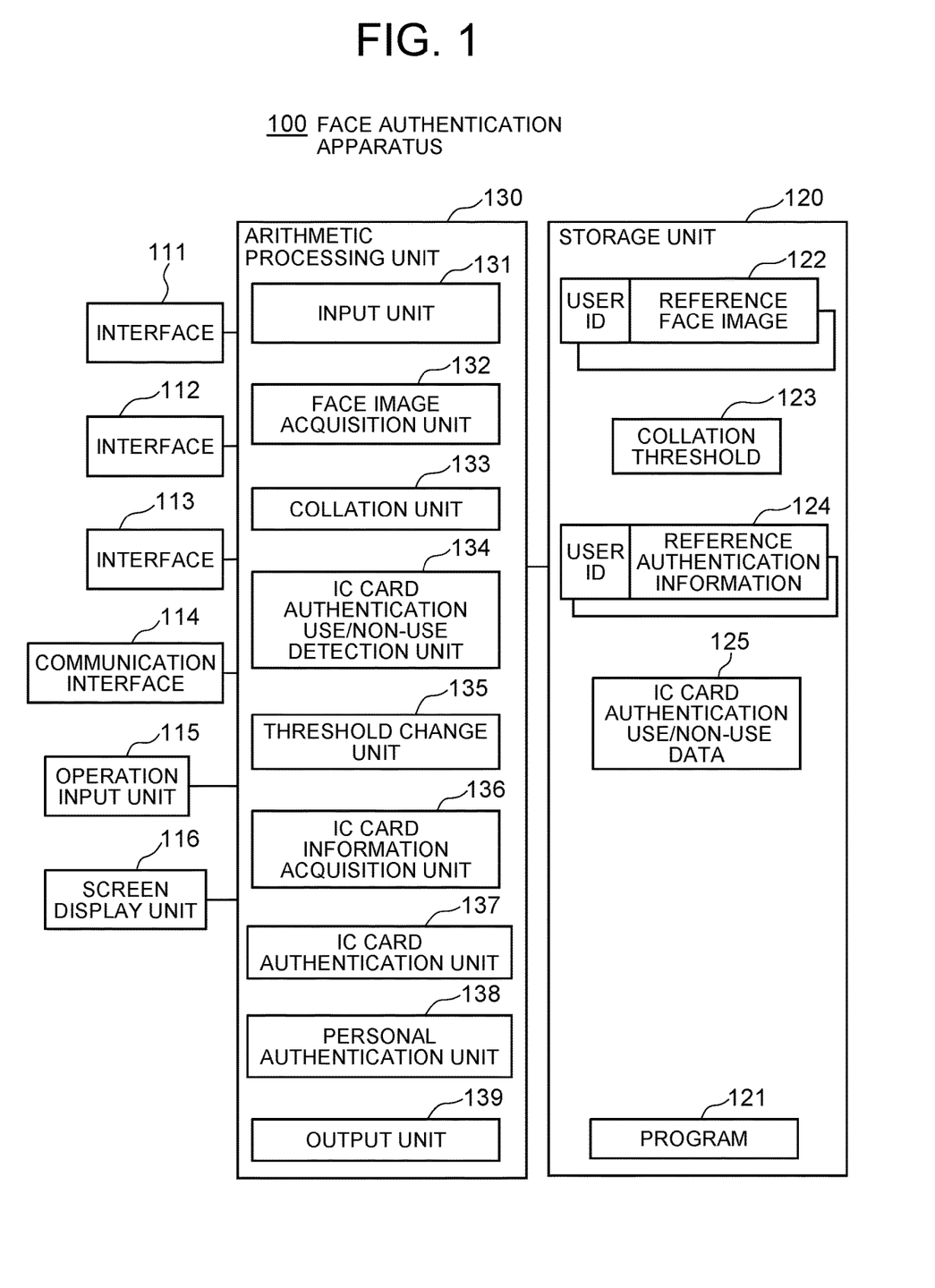
FIG. 1 is a block diagram of a face authentication apparatus according to a first exemplary embodiment of the present invention.
Figure 2:
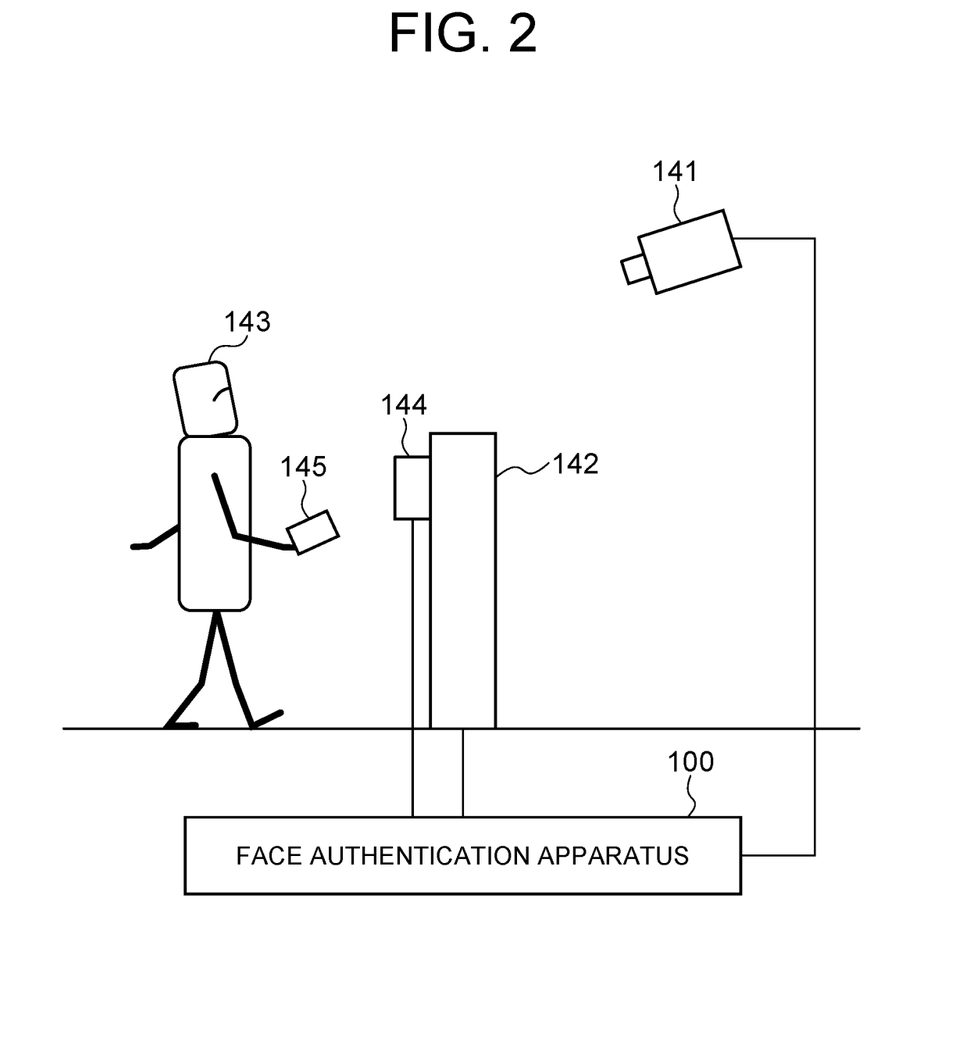
FIG. 2 is a schematic diagram of an access management system including the face authentication apparatus according to the first exemplary embodiment of the present invention.

FIG. 1 is a block diagram of a face authentication apparatus 100 according to a first exemplary embodiment of the present invention. FIG. 2 is a schematic diagram of an access management system including the face authentication apparatus 100 according to the present embodiment. Referring to FIG. 1, the face authentication apparatus 100 of the present embodiment includes an interface 111 with a camera unit 141, an interface 112 with an IC card reader 144, an interface 113 with a gate apparatus 142, a communication interface 114, an operation input unit 115, a screen display unit 116, a storage unit 120, and an arithmetic processing unit 130.

The interface 111 is configured to transmit and receive signals to and from the camera unit 141 that images a face of a person who is an authentication target. Transmission and reception of signals may be performed via wired or wireless communication. As illustrated in FIG. 2, the camera unit 141 is set at a position with an image angle at which the camera unit 141 can image a face portion of a user 143 passing through a gate apparatus 142. The camera unit 141 is an imaging device configured of a Charge Coupled Device (CCD) element or a Complementary Metal-oxide Semiconductor (CMOS) element that outputs image data, captured by imaging a face of a person to be collated, to the arithmetic processing unit 130 via the interface 111. The image data captured by the camera unit 141 is, for example, a black-and-white gradation image of 256 gradations, but may be a color image.

The interface 112 is configured to transmit and receive signals to and from the IC card reader 144. Transmission and reception of signals may be performed via wired or wireless communication. The IC card reader 144 is mounted near the gate apparatus 142, as illustrated in FIG. 2. The IC card reader 144 is configured such that, when the user 143 brings the IC card 145 held by himself/herself closer thereto when passing through the gate apparatus 142, the IC card reader 144 reads information stored on the IC card 145 in a noncontact manner and outputs it to the arithmetic processing unit 130 via the interface 112. On the IC card 145, information including a user ID and authentication information is stored.

The interface 113 is configured to transmit and receive signals such as a result of personal authentication to and from the gate apparatus 142. Transmission and reception of signals may be performed via wired or wireless communication. The gate apparatus 142 performs predetermined operation according to a result of personal authentication received. Predetermined operation may include various types of operation. For example, the gate apparatus 142 automatically open/close operation of a gate attached to the gate apparatus 142 according to the result of personal authentication. The gate apparatus 142 may include a gate bar that is manually openable/closable, and release lock of the gate bar for a certain period only when personal authentication has succeeded. The gate 142 may output a message of passage propriety visually or by sound from an alarm provided to the gate apparatus 142, according to the result of personal authentication. The gate apparatus 142 may be a stationary type, or a portable type that can be moved. The gate apparatus 142 may be an apparatus independent of the face authentication apparatus 100, or an apparatus integrated with the face authentication apparatus 100.

The communication interface 114 is a communication device that performs data communication with an external device such as a terminal. The communication system may be wired or wireless communication.

The operation input unit 115 includes an input device such as a keyboard and numeric keys, and is configured to detect an operation by an operator and output it to the arithmetic processing unit 130.

The screen display unit 116 is a screen display device such as a liquid crystal display (LCD) or a plasma display panel (PDP). The screen display unit 116 is configured to display various types of information such as a collation result on a screen according to an instruction from the arithmetic processing unit 130.

The storage unit 120 is a storage device such as a hard disk or a memory. The storage unit 120 is configured to store processing information and a program 121 necessary for various types of processing to be performed in the arithmetic processing unit 130.

The program 121 implements various processing units by being read into the arithmetic processing unit 130 and executed. The program 121 is read, in advance, from an external device (not illustrated) or a storage medium (note illustrated) via a data input/output function such as the communication interface 114, and is stored in the storage unit 120.

Main processing information stored in the storage unit 120 includes reference face image data 122, a collation threshold 123, reference card data 124, and IC card authentication use/non-use data 125.

The reference face image data 122 is data in which a face image, serving as a reference to be used when face collation is performed, and a user ID are associated with each other. In the reference face image data 122, at least one face image of a person having a user ID can be associated with the user ID as a reference face image. Alternatively, in the reference face image data 122, the feature amount of a face, extracted from a face image of a person having a user ID, may be associated with the user ID as reference face information. Here, the feature amount of a face is a numerical value representing a feature of each part in the face information for recognizing the positional relationship or shape of each part such as eye, nose, mouth, eyebrow, or the like constituting the face, and is used for similarity determination or the like between images.

The collation threshold 123 is a threshold to be used for performing face collation. In the case of the present embodiment, the collation threshold 123 is shared by every user ID. When the collation threshold increases, the false acceptance rate is lowered and the security strength is enhanced.

The reference card data 124 is data in which authentication information, serving as a reference to be used when IC card authentication is performed, and a user ID are associated with each other. In the reference card data 124, information to be collated with authentication information stored on the IC card 145 having the user ID is recorded as reference authentication information in association with the user ID.

The IC card authentication use/non-use data 125 is data representing whether or not the IC card authentication is used. For example, the IC card authentication use/non-use data 125 is set to have a value 1 when the IC card authentication is used, and is reset to a value 0 when the IC card authentication is not used.

The arithmetic processing unit 130 is an arithmetic processing unit having a microprocessor such as an MPU and its peripheral circuits. The arithmetic processing unit 130 is configured to read the program 121 from the storage unit 120 and executes it to thereby allow the hardware and the program 121 to operate in cooperation with each other to implement various processing units. The processing units implemented by the arithmetic processing unit 130 include an input unit 131, a face image acquisition unit 132, a collation unit 133, an IC card authentication use/non-use detection unit 134, a threshold change unit 135, an IC card information acquisition unit 136, an IC card authentication unit 137, a personal authentication unit 138, and an output unit 139.

The input unit 131 is configured to receive the reference face image data 122 and the reference card data 124 input from the outside via the communication interface 114 or the operation input unit 115, and store them in the storage unit 120.

The face image acquisition unit 132 is configured to receive image data of a person to be collated, captured by the camera unit 141 and input via the interface 111, and acquire (detect) a face image of the person to be collated from the image data. The face image acquisition unit 132 performs matching between a template representing a general face contour of a person and the image data to thereby acquire a face image existing in the image data. Besides template matching, various publicly-known face detection algorithms may be used. The face image acquisition unit 132 is configured to transmit the acquired face image to the collation unit 133.

The collation unit 133 is configured to read the reference face image data 122 and the collation threshold 123 from the storage unit 120, calculates, for each user ID, similarity between the reference face image included in the reference face image data 122 and a face image of a collation target acquired by the face image acquisition unit 132, and based on the result of comparing the calculated similarity for each user ID with the collation threshold 123, determine whether or not the face image of the collation target matches a reference face image of any user ID included in the reference face image data 152. As an example of similarity, a cross-correlation coefficient between face images may be used. In that case, the similarity is high when a face portion of the same person is included in the two face images, and the similarity is low when face portions of different persons are included in the two face images. As similarity between face images, besides the cross-correlation coefficient, publicly-known similarity calculation technique may be used. For example, the collation unit 133 may be configured to extract a feature amount from the acquired face image of the collation target, collate the feature amount of the face extracted from the face image of the collation target with the feature amount of the reference face included in the reference face image data 122, and calculate the similarity between the reference face image and the face image of the collation target.

The collation unit 133 is also configured to generate an authentication result representing face authentication failure when there is no reference face image of a user ID in which the similarity with the face image of the collation target acquired by the face image acquisition unit 132 is equal to or larger than the collation threshold 123. The collation unit 133 is also configured to, when there is at least one reference face image in which the similarity with the face image of the collation target acquired by the face image acquisition unit 162 is equal to or larger than the collation threshold 123, generate an authentication result representing face authentication success including the user ID having the largest similarity. Moreover, the collation unit 133 is configured to transmit the authentication result to the personal authentication unit 138.

The IC card authentication use/non-use detection unit 134 is configured to detect use/non-use of IC card authentication. The IC card authentication use/non-use detection unit 134 is configured to detect use/non-use of IC card authentication before starting operation of the face authentication apparatus 100. The IC card authentication use/non-use detection unit 134 is also configured to detect use/non-use of IC card authentication during operation of the face authentication apparatus 100.

The IC card authentication use/non-use detection unit 134 detects that it is in a state of using IC card authentication when receiving a command indicating use of IC card authentication from a manager via the communication interface 114 or the operation input unit 115. On the contrary, the IC card authentication use/non-use detection unit 134 detects that it is in a state of not using IC card authentication when receiving a command indicating non-use of IC card authentication from a manager. However, a method of detecting use/non-use of IC card authentication is not limited thereto. For example, the IC card authentication use/non-use detection unit 134 may be configured to check whether or not the interface 112 with the IC card reader 144 is provided to the arithmetic processing unit 130, and when it is provided, detect that it is in a state of using IC card authentication, while when it is not provided, detect that it is in a state of not using IC card authentication. The IC card authentication use/non-use detection unit 134 is also configured to update the IC card authentication use/non-use data 125 stored in the storage unit 120 according to the detected use/non-use of IC card authentication. The IC card authentication use/non-use detection unit 134 is also configured to, when the IC card authentication use/non-use data 125 is set or changed, notify the threshold change unit 135 of the fact.

The threshold change unit 135 is configured to, when receiving a notice from the IC card authentication use/non-use detection unit 134, read the IC card authentication use/non-use data 125 from the storage unit 120, determine the value of the collation threshold 123 according to the data, and store the determined collation threshold 123 in the storage unit 120. Specifically, the threshold change unit 135 determines the collation threshold 123 to be larger when the IC card authentication is used, compared with the case of not using it. In the present embodiment, the threshold change unit 135 sets the collation threshold 123 to have a larger value TH than a predetermined value TO when the IC card authentication is used to keep the false acceptance rate lower to thereby enhance the security strength. On the other than, the threshold change unit 135 sets the collation threshold 123 to have a smaller value TL than the predetermined value TO when the IC card authentication is not used to keep a false rejection rate lower to thereby improve the convenience.

The IC card information acquisition unit 136 is configured to receive stored information of the IC card 145 that is read by the IC card reader 144 and input via the interface 112. The IC card information acquisition unit 136 is configured to transmit the acquired stored information of the IC card 145 to the IC card authentication unit 137.

The IC card authentication unit 137 is configured to read the reference card data 124 from the storage unit 120, collates the reference authentication information included in the reference card data 124 with the stored information of the IC card 145 acquired by the IC card information acquisition unit 136, and performs IC card authentication based on the collation result. For example, the IC card authentication unit 137 extracts user ID and authentication information from the stored information of the IC card 145, compares the reference authentication information included in the reference card data 124 having the same user ID as the extracted user ID with the extracted authentication information. When they match, the IC card authentication unit 137 determines that the authentication has succeeded, while when they do not match, the IC card authentication unit 137 determines that the authentication has failed. However, any publicly-known IC card authentication technique can be used, without limiting to such an authentication method. Moreover, the IC card authentication unit 137 is configured to transmit an authentication result including the user ID in which authentication has succeeded, to the personal authentication unit 138.

The personal authentication unit 138 is configured to perform personal authentication on the basis of the authentication result of the collation unit 133, the authentication result of the IC card authentication unit 137, and the IC card authentication use/non-use data 125. Specifically, the personal authentication unit 138 reads the IC card authentication use/non-use data 125 from the storage unit 120 and determines use/non-use of IC card authentication. Then, when the IC card authentication use/non-use data 125 indicates that IC card authentication is used, the personal authentication unit 138 derives a result of personal authentication on the basis of the authentication result of the collation unit 133 and the authentication result of the IC card authentication unit 137. That is, the personal authentication unit 138 determines that personal authentication has succeeded when both the authentication result of the collation unit 133 and the authentication result of the IC card authentication unit 137 show authentication success, and both user IDs in which authentication has succeeded are the same. On the other hand, the personal authentication unit 138 determines that personal authentication has failed when at least one of the authentication result of the collation unit 133 and the authentication result of the IC card authentication unit 137 shows authentication failure or, although authentication has succeeded in both cases, the user IDs in which authentication has succeeded differ from each other. Moreover, when the IC card authentication use/non-use data 125 indicates that IC card authentication is not used, the personal authentication unit 138 derives a result of personal authentication on the basis of the authentication result of the collation unit 133, without using the authentication result of the IC card authentication unit 137. That is, the personal authentication unit 138 determines that personal authentication has succeeded when the authentication result of the collation unit 133 shows authentication success, while determines that the personal authentication has failed when the authentication result of the collation unit 133 shows authentication failure. The personal authentication unit 138 is configured to transmit, to the output unit 139, a result of personal authentication including the user ID whose personal authentication has succeeded.

The output unit 139 is configured to transmit the result of personal authentication generated by the personal authentication unit 138 to the gate apparatus 142 via the interface 113. The output unit 139 may display the result of personal authentication generated by the personal authentication unit 138 on the screen display unit 116 and/or transmit it to an external device via the communication interface 114.

Figure 3:
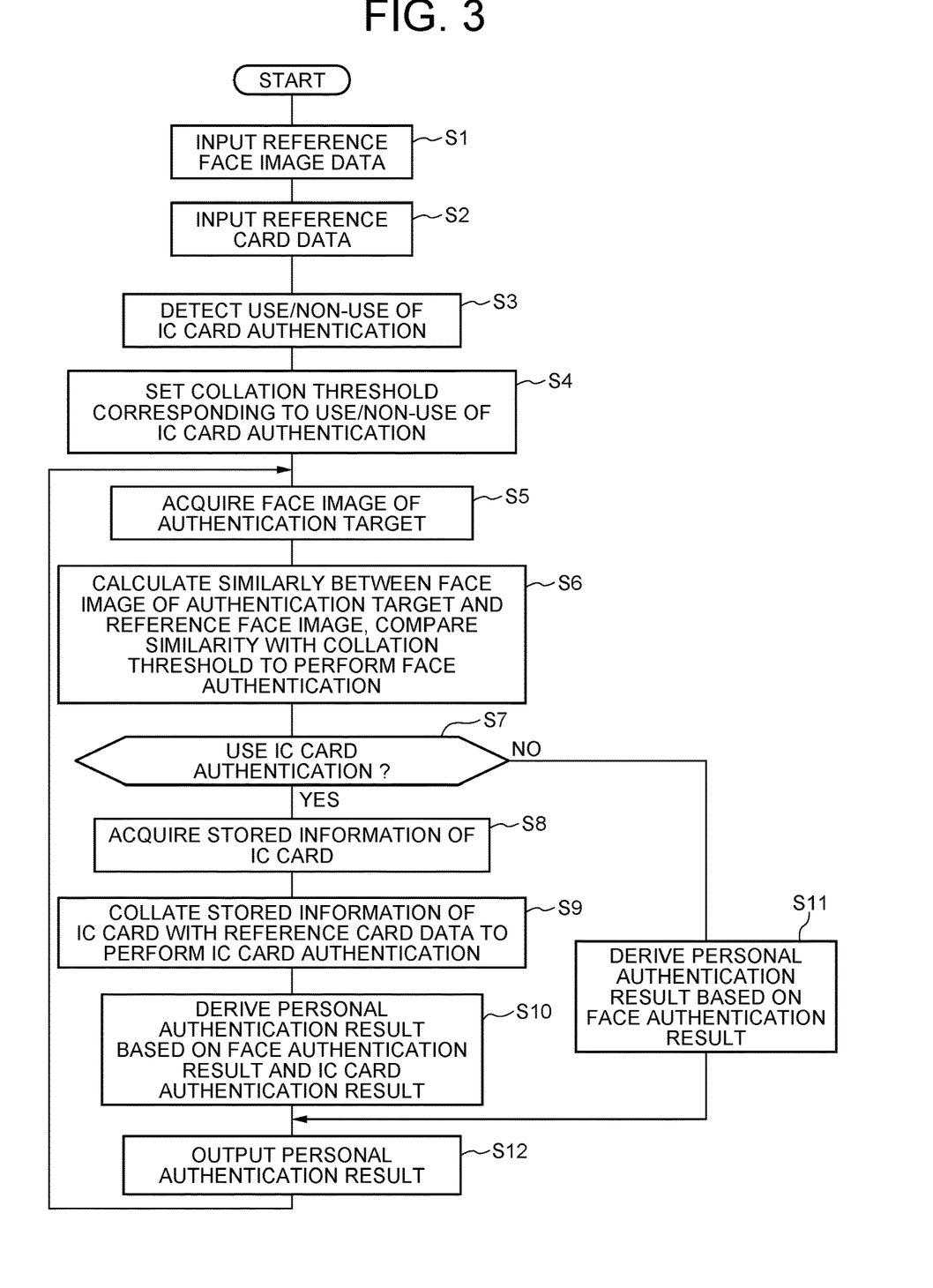
FIG. 3 is a flowchart illustrating an overall operation of the face authentication apparatus according to the first exemplary embodiment of the present invention.

FIG. 3 is a flowchart illustrating the overall operation of the face authentication apparatus 100. Referring to FIG. 3, first, the input unit 131 of the face authentication apparatus 100 receives the reference face image data 122 input from the outside, and stores it in the storage unit 120 (step S1). Next, the input unit 131 receives the reference card data 124 input from the outside, and stores it in the storage unit 120 (step S2). Then, the IC card authentication use/non-use detection unit 134 of the face authentication apparatus 100 detects use/non-use of IC card authentication on the basis of a command input from the communication interface 114 or the operation input unit 115, and sets the IC card authentication use/non-use data 125 on the basis of the detection result (step S3). That is, the IC card authentication use/non-use detection unit 134 sets the value of the IC card authentication use/non-use data 125 to 1 when a command of using IC card authentication is input, while sets the value to 0 when a command of not using IC card authentication is used. Then, the threshold change unit 135 of the face authentication apparatus 100 sets the collation threshold 123 having the value corresponding to the IC card authentication use/non-use data 125 in the storage unit 120 (step S4). That is, the threshold change unit 135 sets the collation threshold 123 having the value TH when IC card authentication is used, while sets the collation threshold 123 having the value TL (<TH) when IC card authentication is not used. The processes of steps S1 to S4 described above are preparation processes for starting operation of face authentication, and may be omitted if they have been performed once. Note that use/non-use of IC card authentication can be changed during operation, as described below with reference to FIG. 4.

During operation, the face authentication apparatus 100 operates as described below. First, the face image acquisition unit 132 of the face authentication apparatus 100 receives image data that is obtained by capturing a collation target and input from the camera unit 141, and acquires the face image of the collation target from the image data (step S5). Then, the collation unit 133 of the face authentication apparatus 100 calculates similarity between each reference face image included in the reference face image data 122 and the face image of the collation target acquired by the face image acquisition unit 132 and compares the similarity with the collation threshold 123 to thereby perform face authentication (step S6).

Then, the IC card information acquisition unit 136 of the face authentication apparatus 100 reads the IC card authentication use/non-use data 125 from the storage unit 120, and checks the setting state of usability of IC card authentication (step S7). The IC card information acquisition unit 136 determines that IC card authentication is usable when the value of the IC card authentication use/non-use data 125 is 1, and determines that IC card authentication is unusable when the value is 0.

When determining that IC card authentication is usable, the IC card information acquisition unit 136 acquires stored information read by the IC card reader 144 from the IC card 145 of the user 143 who passes through the gate apparatus 142 (step S8). Then, the IC card authentication unit 137 of the face authentication apparatus 100 performs IC card authentication by collating the reference authentication information included in the reference card data 124 with the stored information of the IC card 145 acquired by the IC card information acquisition unit 136 (step S9). Then, the personal authentication unit 138 of the face authentication apparatus 100 derives a result of personal authentication on the basis of the result of face authentication performed at step S6 and the result of IC card authentication performed at step S9 (step S10). On the other hand, when it is determined that IC card authentication is unusable, the personal authentication unit 138 derives a result of personal authentication on the basis of the result of face authentication performed at step S6, without performing IC card authentication (step S11).

Next, the output unit 139 of the face authentication apparatus 100 outputs the result of personal authentication to the gate apparatus 142 via the interface 113 (step S12). Then, the face authentication apparatus 100 returns to step S5 and repeats the same processes as those described above.

Figure 4:
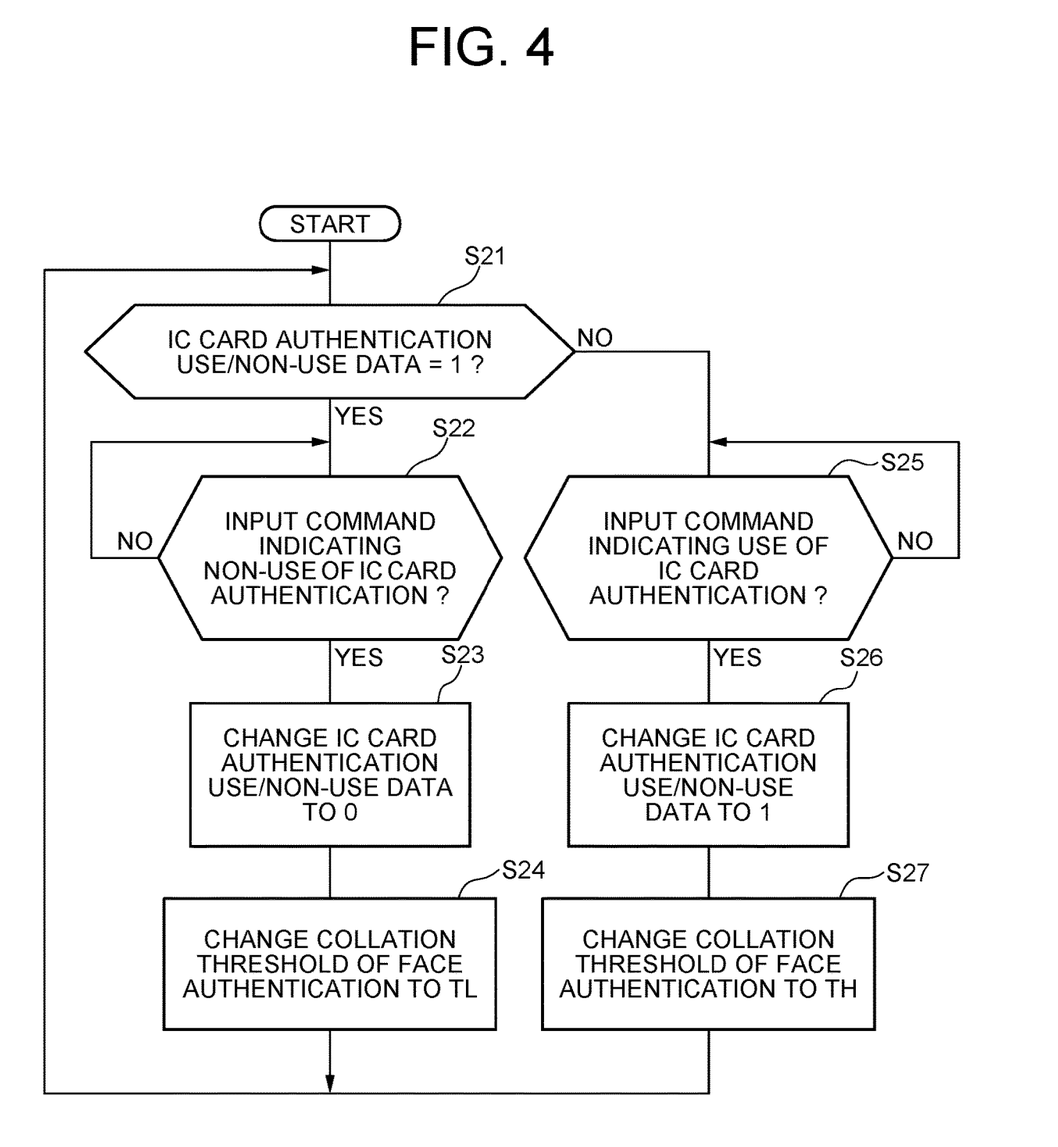
FIG. 4 is a flowchart illustrating an overall operation of the face authentication apparatus according to the first exemplary embodiment of the present invention.

The face authentication apparatus 100 is also configured to perform processes illustrated in FIG. 4 parallel to the processes illustrated in FIG. 3. Referring to FIG. 4, when the value of the IC card authentication use/non-use data 125 stored in the storage unit 120 is 1, that is, when IC card authentication is used (YES at step S21), the IC card authentication use/non-use detection unit 134 of the face authentication apparatus 100 monitors an input of a command of not using IC card authentication from a user via the interface 114 or the operation input unit 115 (step S22). Then, when a command of not-using IC card authentication is input, the IC card authentication use/non-use detection unit 134 changes the value of the IC card authentication use/non-use data 125, stored in the storage unit 120, to 0 (step S24). Then, the threshold change unit 135 of the face authentication apparatus 100 changes the value of the collation threshold 123, stored in the storage unit 120, to TL (step S25). Then, the face authentication apparatus 100 returns to the process of step S21.

On the other hand, when the value of the IC card authentication use/non-use data 125 stored in the storage unit 120 is 0, that is, when IC card authentication is not used (NO at step S21), the IC card authentication use/non-use detection unit 134 monitors an input of a command of using IC card authentication from a user via the interface 114 or the operation input unit 115 (step S25). Then, when a command of using IC card authentication is input, the IC card authentication use/non-use detection unit 134 changes the value of the IC card authentication use/non-use data 125, stored in the storage unit 120, to 1 (step S26). Then, the threshold change unit 135 of the face authentication apparatus 100 changes the value of the collation threshold 123, stored in the storage unit 120, to TH (step S27). Then, the face authentication apparatus 100 returns to the process of step S21.

As described above, in the face authentication apparatus 100 of the present embodiment, when personal authentication is performed by using both face authentication and IC card authentication, the collation threshold 123 to be used for face authentication is set to TH that is larger than the reference value T0. Therefore, security strength is more enhanced (security strength of this case is assumed to be SL6.) Meanwhile, in the face authentication apparatus 100 of the present embodiment, when personal authentication is performed based on the face authentication result without using IC card authentication, the collation threshold 123 to be used for face authentication is set to TL that is smaller than the reference value T0. Therefore, security strength is lowered (security strength of this case is assumed to be SL1). Consequently, the difference in the security strength between the case of using IC card authentication and the case of not using it (SL6-SL1) in the face authentication apparatus 100 can be more prominent.

On the other hand, in the case of fixing the collation threshold 123 to be used for face authentication regardless of use/non-use of IC card authentication, if it is fixedly set to T0, security strength when personal authentication is performed by face authentication without using IC card authentication is higher than SL1 (security strength of this case is assumed to be SL2), and the security strength when personal authentication is performed by both face authentication and IC card authentication is lower than SL6 (security strength of this case is assumed to be SL5). Accordingly, the achieved difference in the security strength (SL5-SL2) is smaller than the above-described difference in the security strength (SL6-SL1).

Furthermore, in the case of employing the concept of Patent Literature 1, that is, the threshold for face authentication is decreased as higher security strength is achieved by an authentication method other than face authentication, the collation threshold 123 is set to TL when IC card authentication is used and the collation threshold 123 is set to TH when IC card authentication is not used. In that case, the security strength when personal authentication is performed by face authentication without using IC card authentication is higher than SL2 (security strength of this case is assumed to be SL3), and the security strength when personal authentication is performed by both face authentication and IC card authentication is lower than SL5 (security strength of this case is assumed to be SL4). Accordingly, the achieved difference in the security strength (SL4-SL3) is smaller than the above-described difference in the security strength (SL5-SL2).

Figure 5:
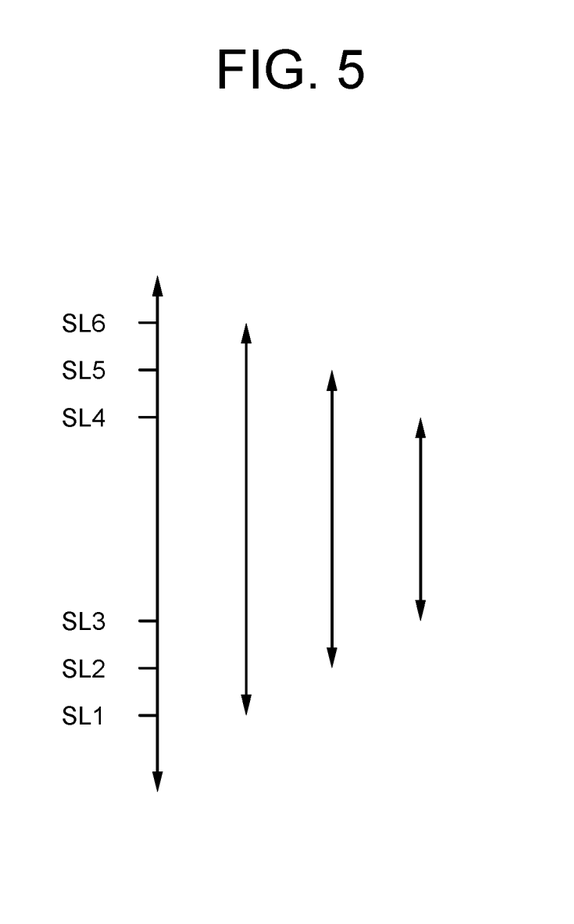
FIG. 5 is a schematic diagram illustrating security strength determined by a combination of face image authentication and IC card authentication and a collation threshold used in the face image authentication, in the first exemplary embodiment of the present invention.

FIG. 5 is a schematic diagram illustrating security strength determined by a combination of face authentication and IC card authentication and a collation threshold used in face authentication. In FIG. 5, SL1 to SL6 represent security strength by the following combinations:

SL1: personal authentication by only face authentication with collation threshold TL SL2: personal authentication by only face authentication with collation threshold T0

SL3: personal authentication by only face authentication with collation threshold TH SL4: personal authentication by both face authentication with collation threshold TL and IC card authentication SL5: personal authentication by both face authentication with collation threshold T0 and IC card authentication SL6: personal authentication by both face authentication with collation threshold TH and IC card authentication Here, TH>T0>TL is established.

As described above, according to the present embodiment, by selecting use/non-use of IC card authentication, the difference in the security strength between the operation placing emphasis on security and the operation placing emphasis on convenience, which can be switched from each other, in the face authentication apparatus 100 can be more prominent.

Second Exemplary Embodiment

Next, a second exemplary embodiment of the present invention will be described. A face authentication apparatus 200 of the present embodiment differs from that of the first exemplary embodiment in that the threshold change unit 135 is configured to change the value of the collation threshold 123 according to a request from a user. The other configurations and operation are the same as those of the first exemplary embodiment.

Figure 6:
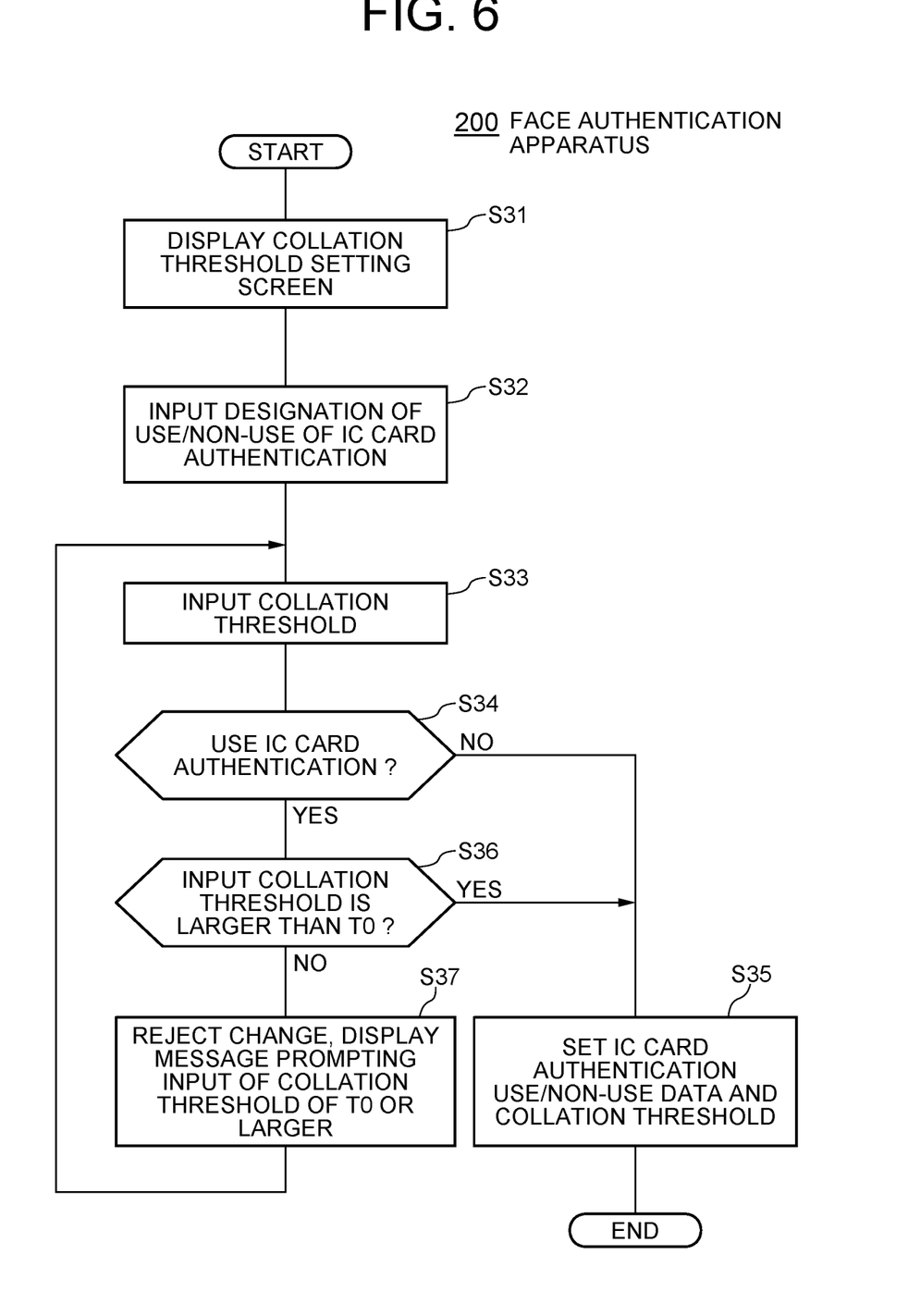
FIG. 6 is a flowchart illustrating an exemplary operation of a threshold change unit in a face authentication apparatus according to a second exemplary embodiment of the present invention.

FIG. 6 is a flowchart illustrating exemplary processing performed by the threshold change unit 135 to change a collation threshold according to a request from a user. The threshold change unit 135 starts processing illustrated in FIG. 6 when, for example, a command requesting a change of a collation threshold is input from the operation input unit 115.

Figure 7:
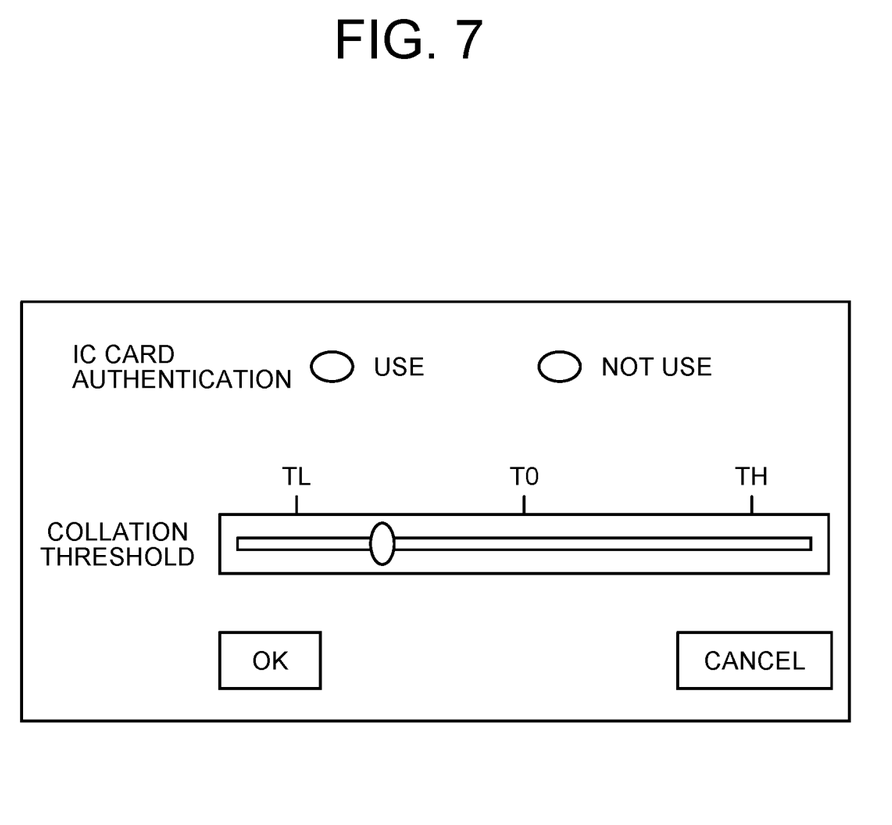
FIG. 7 illustrates an example of a collation threshold setting screen displayed by the threshold change unit in the face authentication apparatus according to the second exemplary embodiment of the present invention.

The threshold change unit 135 first displays a collation threshold setting screen on the screen display unit 116 (step S31). FIG. 7 illustrates an example of a collation threshold setting screen. The collation threshold setting screen of this example includes a radio button for setting use/non-use of IC card authentication, a slide bar for designating the value of a collation threshold, an OK button, and a cancel button.

Then, the threshold change unit 135 receives a designation of use/non-use of IC card authentication input from a user (step S32). In the collation threshold setting screen of FIG. 7, the user designates use/non-use of IC card authentication with a radio button. Then, the threshold change unit 135 receives a collation threshold input from the user (step S33). In the collation threshold setting screen of FIG. 7, the user designates a collation threshold by moving the position of the knob of the slide bar to left or right. Then, when the OK button is clicked, the threshold change unit 135 executes processing of steps S34 and after illustrated in FIG. 6. When the cancel button is clicked, the processing of FIG. 6 ends.

At step S34, the threshold change unit 135 determines whether or not to use IC card authentication on the basis of the state of the radio button. In the case of not using IC card authentication (NO at step S34), the threshold change unit 135 updates the collation threshold 123 of the storage unit 120 with the collation threshold of the value corresponding to the position of the knob of the slide bar, and updates the IC card authentication use/non-use data 125 to a non-use state (step S35). Meanwhile, in the case of using IC card authentication (YES at step S34), the threshold change unit 135 determines whether or not the value corresponding to the position of the knob of the slide bar is larger than the predetermined value T0 (step S36). When the value is larger than the predetermined value T0, the threshold change unit 135 updates the collation threshold 123 in the storage unit 120 with the collation threshold of the value corresponding to the position of the knob of the slide bar, and updates the IC card authentication use/non-use data 125 to a use state (step S35).

On the other hand, when the value corresponding to the position of the knob of the slide bar is not larger than the predetermined value T0 (NO at step S36), the threshold change unit 135 rejects changing, and displays on the screen display unit 116 a message to prompt inputting of a collation threshold equal to or larger than the predetermined value T0 (step S37). Then, the threshold change unit 135 returns to step S33 and receives re-input of a collation threshold.

As described above, according to the present embodiment, before changing the value of the collation threshold 123 according to a request from a user, the threshold change unit 135 checks use/non-use of IC card authentication and whether or not the value of the collation threshold 123 after a change is larger than a predetermined value, and when the value of the collation threshold after the change is not larger than the predetermined value although IC card authentication is used, the threshold change unit 135 rejects the request. Thereby, it is possible to prevent the security strength from being lowered at the time of using IC card authentication.

In FIG. 6, in the case of not using IC card authentication, the threshold change unit 135 changes the collation threshold with the value designated by the user. However, it is also possible to check whether or not the value designated by the user is smaller than the predetermined value T0, and if not, the threshold change unit 135 may reject the request. Thereby, it is possible to prevent the security strength from being lowered at the time of using IC card authentication.

In the exemplary embodiments described above, IC card authentication is used as an authentication method other than face authentication. However, password authentication or the like may be used as an authentication method other than face authentication. Further, authentication is not limited to two-factor authentication, and multi-factor authentication may be used. Furthermore, multi-stage authentication such as two-stage authentication may be used. In that case, an authentication method other than face authentication may be iris authentication, fingerprint authentication, or the like.

Moreover, in the exemplary embodiments described above, a collation threshold used for face authentication is shared by all user IDs. However, it is also possible to set a collation threshold for each user.

Third Exemplary Embodiment

Figure 8:
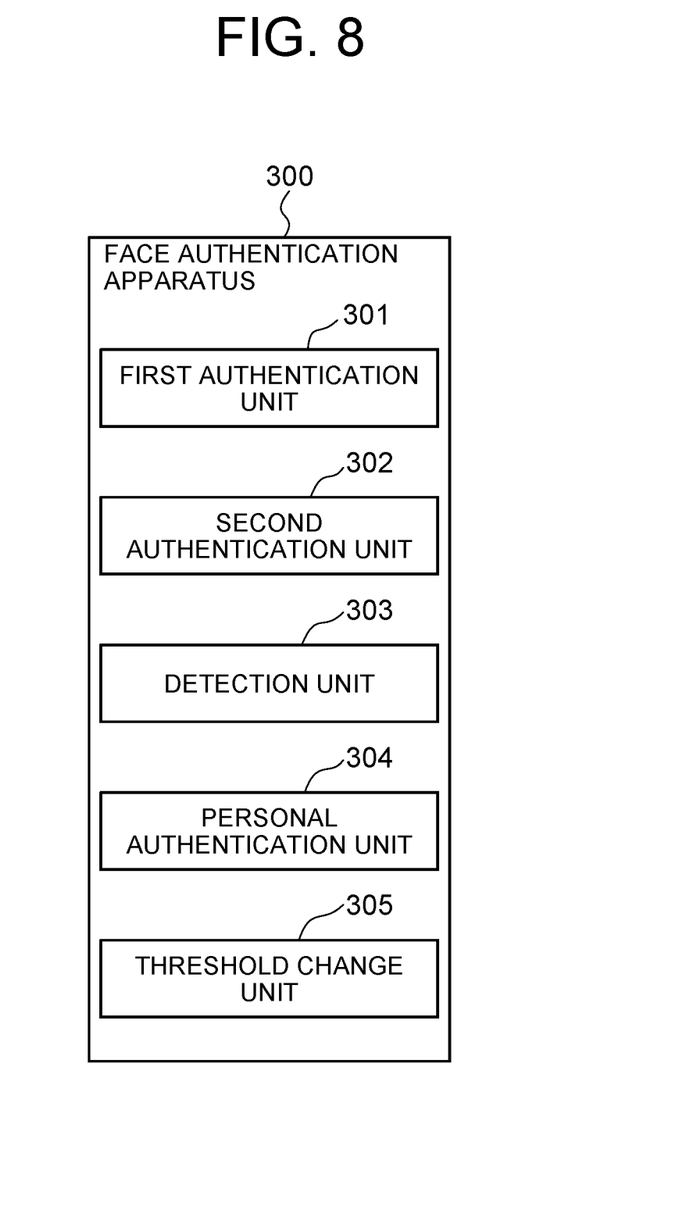
FIG. 8 is a block diagram of a face authentication apparatus according to a third exemplary embodiment of the present invention.

Next, a third exemplary embodiment of the present invention will be described. FIG. 8 is a block diagram of a face authentication apparatus 300 according to the present embodiment. Referring to FIG. 8, the face authentication apparatus 300 includes a first authentication unit 301, a second authentication unit 302, a detection unit 303, a personal authentication unit 304, and a threshold change unit 305.

The first authentication unit 301 is configured to perform first authentication on a face image of an authentication target on the basis of a threshold. The first authentication unit 301 may have a configuration similar to that of the collation unit 133 of FIG. 1, but it is not limited thereto. The second authentication unit 302 is configured to perform second authentication by an authentication method other than face authentication. The second authentication unit 302 may have a configuration similar to that of the IC card authentication unit 137 of FIG. 1, but it is not limited thereto. The detection unit 303 is configured to detect use/non-use of the second authentication unit 302. The detection unit 303 may have a configuration similar to that of the IC card authentication use/non-use detection unit 134 of FIG. 1, but it is not limited thereto. The threshold change unit 305 is configured to set a larger value to the threshold when the second authentication unit 302 is used, compared with the case of not using it. The threshold change unit 305 may have a configuration similar to that of the threshold change unit 135 of FIG. 1, but it is not limited thereto. The personal authentication unit 304 is configured to perform personal authentication on the basis of a result of first authentication when the second authentication unit 302 is not used, while perform personal authentication on the basis of a result of first authentication and a result of second authentication when the second authentication unit 302 is used. The personal authentication unit 304 may have a configuration similar to that of the personal authentication unit 138 of FIG. 1, but it is not limited thereto.

The face authentication apparatus 300 according to the present embodiment configured as described above operates as described below. That is, the detection unit 303 detects use/non-use of the second authentication by an authentication method other than face authentication. When the second authentication is used, the threshold change unit 305 sets a larger value to the threshold of the first authentication in which authentication is performed on a face image of an authentication target based on the threshold, compared with the case of not using the second authentication. With use of the threshold after the setting, the personal authentication unit 138 performs personal authentication on the basis of a result of the first authentication when the second authentication unit 302 is not used, while performs personal authentication on the basis of a result of the first authentication and a result of the second authentication when the second authentication is used.

As described above, according to the present embodiment, by selecting use/non-use of another authentication method, the difference in performance between the operation placing emphasis on security and the operation placing emphasis on convenience, which can be switched from each other, in the face authentication apparatus can be more prominent. This is because the threshold change unit sets a larger value to the threshold when the second authentication unit is used, compared with the case of not using it.

While the present invention has been described with reference to the exemplary embodiments described above, the present invention is not limited to the above-described embodiments. The form and details of the present invention can be changed within the scope of the present invention in various manners that can be understood by those skilled in the art.

For example, in the first exemplary embodiment, in order to increase the difference in the security strength, when the IC card authentication is used, the value TH larger than the predetermined value T0 is used as the collation threshold 123 to thereby enhance the security strength, while when the IC card authentication is not used, the value TL smaller than the predetermined value T0 is used as the collation threshold 123 to thereby lower the security strength. However, the base of the present invention is to use a larger collation threshold 123 when authentication other than face authentication is used, compared with the case of not using it. Therefore, when the IC card authentication is not used, the collation threshold 123 may have a value that is same as the value T0. Meanwhile, face authentication includes walk-through face authentication that enables face authentication when a person walks without stopping in front of a camera, and triggered face authentication in which face authentication is performed with a trigger such as stopping in front of a gate and touching a screen. Therefore, as a set value of the collation threshold 123 when the IC card authentication is not used, the collation threshold 123 may take the value T0 for face authentication with a trigger, while the collation threshold 123 may take the value TL for walkthrough face authentication in which convenience is preferred.

In the first exemplary embodiment, when the IC card authentication is used, face authentication is performed independent of the IC card authentication. However, in the case of using the IC card authentication, face authentication may be performed by using an authentication result of the IC card authentication. Specifically, in the case of using the IC card authentication, IC card authentication is performed first, and then face authentication is performed with use of the result of the IC card authentication. Then, in the face authentication, with reference to the user ID in which authentication has succeeded in the IC card authentication, the similarity between the reference face image registered in the reference face image data 122 and the face image of the collation target is calculated to collate the two face images with each other. In this way, by performing collation between a personal face identified by the IC card authentication with the face of the collation target, the processing amount of face authentication at the time of using IC card authentication can be reduced, and the authentication accuracy can be enhanced.

INDUSTRIAL APPLICABILITY

The present invention is applicable to an access monitoring system, an attendance management system, and the like, and in particular, suitable for the case of improving convenience and security by automatically correct the threshold used for collation appropriately, without placing a burden on the users.

The whole or part of the exemplary embodiments disclosed above can be described as, but not limited to, the following supplementary notes.

Supplementary Note 1

A face authentication apparatus comprising:
a first authentication unit that performs first authentication on a face image of an authentication target based on a threshold;
a second authentication unit that performs second authentication by an authentication method other than face authentication;

a detection unit that detects use or non-use of the second authentication unit;

a threshold change unit that sets a larger value to the threshold when the second authentication unit is used, compared with a value to be set when the second authentication unit is not used; and a personal authentication unit that performs personal authentication based on a result of the first authentication when the second authentication unit is not used, while performs personal authentication based on the result of the first authentication and a result of the second authentication when the second authentication unit is used, with use of the threshold after the setting.

Supplementary Note 2

The face authentication apparatus according to supplementary note 1, wherein before changing the value of the collation threshold according to a request from a user, the threshold change unit checks use or non-use of the second authentication unit and whether or not the value of the threshold after the change is larger than a predetermined value, and when the second authentication unit is used and the value of the threshold after the change is not larger than the predetermined value, the threshold change unit rejects the request.

Supplementary Note 3

The face authentication apparatus according to supplementary note 1 or 2, wherein the detection unit performs the detection based on a command from a user designating use or non-use of the second authentication unit.

Supplementary Note 4

The face authentication apparatus according to any of supplementary notes 1 to 3, wherein the detection unit performs the detection based on presence or absence of an interface for acquiring authentication information, to be used in the second authentication unit, from the authentication target.

Supplementary Note 5

The face authentication apparatus according to any of supplementary notes 1 to 4, wherein the threshold change unit sets the threshold to be larger than a predetermined value when the second authentication unit is used.

Supplementary Note 6

A face authentication method comprising:

detecting use or non-use of second authentication by an authentication method other than face authentication;

when the second authentication is used, setting a larger value to a threshold of first authentication in which authentication is performed on a face image of an authentication target based on the threshold, compared with a value to be set when the second authentication is not used; and with use of the threshold after the setting, performing personal authentication based on a result of the first authentication when the second authentication unit is not used, while performing personal authentication based on the result of the first authentication and a result of the second authentication when the second authentication unit is used.

Supplementary Note 7

The face authentication methods according to supplementary note 6, wherein the setting of the threshold includes, before changing the value of the threshold according to a request from a user, checking use or non-use of the second authentication and checking whether or not the value of the threshold after the change is larger than a predetermined value, and in a case in which the second authentication is used and the value of the threshold after the change is not larger than the predetermined value, rejecting the request.

Supplementary Note 8

The face authentication method according to supplementary note 6 or 7, wherein the detecting the use or non-use of the second authentication includes detecting the use or non-use based on a command from a user designating the use or non-use of the second authentication.

Supplementary Note 9

The face authentication method according to any of supplementary notes 6 to 8, wherein the detecting the use or non-use of the second authentication includes detecting the use or non-use based on presence or absence of an interface for acquiring authentication information, to be used in the second authentication, from the authentication target.

Supplementary Note 10

The face authentication method according to any of supplementary notes to 9, wherein the setting of the threshold includes setting the threshold to be larger than a predetermined value when the second authentication is used.

Supplementary Note 11

A program for causing a computer to function as:

a first authentication unit that performs first authentication on a face image of an authentication target based on a threshold;

a second authentication unit that performs second authentication by an authentication method other than face authentication;

a detection unit that detects use or non-use of the second authentication unit;

a threshold change unit that sets a larger value to the threshold when the second authentication unit is used, compared with a value to be set when the second authentication unit is not used; and a personal authentication unit that performs personal authentication based on a result of the first authentication when the second authentication unit is not used, while performs personal authentication based on the result of the first authentication and a result of the second authentication when the second authentication unit is used, with use of the threshold after the setting.

Supplementary Note 12

The face authentication apparatus according to any of supplementary notes 1 to 5, wherein in the first authentication, a feature amount of a face extracted from the face image of the authentication target and a feature amount of a face extracted from a reference face image of each registered user are collated with each other, and similarly between the face image and the reference face image is calculated.

Supplementary Note 13

The face authentication apparatus according to any of supplementary notes 1 to 5, wherein
in the setting of the threshold, a value larger than a predetermined value is set to the threshold when the second authentication is used.

Supplementary Note 14

The face authentication apparatus according to any of supplementary notes 1 to 5, wherein
in the setting of the threshold, a value equal to or smaller than a predetermined value is set to the threshold when the second authentication is not used.

Supplementary Note 15

The face authentication apparatus according to any of supplementary notes 1 to 5, wherein
in the first authentication, when the second authentication is used, similarly between the face image of the authentication target and a reference face image of a registered user authenticated by the second authentication is calculated, and the first authentication is performed by comparing the similarity with a threshold.

REFERENCE SIGNS LIST 100 face authentication apparatus
111 interface
112 interface
113 interface
114 communication interface
115 operation input unit
116 screen display unit
120 storage unit
121 program
122 reference face image data
123 collation threshold
124 reference card data
125 IC card authentication use/non-use data
130 arithmetic processing unit
131 input unit
132 face image acquisition unit
133 collation unit
134 IC card authentication use/non-use detection unit
135 threshold change unit
136 IC card information acquisition unit
137 IC card authentication unit
138 personal authentication unit
139 output unit
141 camera unit
142 gate apparatus
143 user
144 IC card reader
145 IC card
200 face authentication apparatus
300 face authentication apparatus
301 first authentication unit
302 second authentication unit
303 detection unit
304 personal authentication unit
305 threshold change unit

The invention claimed is:

1. A face authentication apparatus comprising:
a memory containing program instructions; and
a processor coupled to the memory, wherein the processor is configured to execute the program instructions to:
perform first authentication on a face image of an authentication target based on a threshold;
perform second authentication by an authentication method other than face authentication;
detect use or non-use of the second authentication;
set a larger value to the threshold when the second authentication is used, compared with a value to be set when the second authentication is not used; and
perform personal authentication based on a result of the first authentication when the second authentication is not used, while performing personal authentication based on the result of the first authentication and a result of the second authentication when the second authentication is used, with use of the threshold after the setting;
wherein
the setting of the threshold includes, before changing the value of the threshold according to a request from a user, checking use or non-use of the second authentication and whether or not the value of the threshold after the change is larger than a predetermined value, and when the second authentication is used and the value of the threshold after the change is not larger than the predetermined value, rejecting the request.

2. The face authentication apparatus according to claim 1, wherein
the detecting the use or non-use of the second authentication includes performing the detection based on a command from a user designating use or non-use of the second authentication.

3. The face authentication apparatus according to claim 1, wherein
the detecting the use or non-use of the second authentication includes performing the detection based on presence or absence of an interface for acquiring authentication information, to be used in the second authentication, from the authentication target.

4. The face authentication apparatus according to claim 1, wherein
the setting of the threshold includes setting the threshold to be larger than a predetermined value when the second authentication is used.

5. A face authentication method comprising:
detecting use or non-use of second authentication by an authentication method other than face authentication;
when the second authentication is used, setting a larger value to a threshold of first authentication in which authentication is performed on a face image of an authentication target based on the threshold, compared with a value to be set when the second authentication is not used; and
with use of the threshold after the setting, performing personal authentication based on a result of the first authentication when the second authentication unit is not used, while performing personal authentication based on the result of the first authentication and a result of the second authentication when the second authentication unit is used, wherein
the setting of the threshold includes, before changing the value of the threshold according to a request from a user, checking use or non-use of the second authentication and checking whether or not the value of the threshold after the change is larger than a predetermined value, and in a case in which the second authentication is used and the value of the threshold after the change is not larger than the predetermined value, rejecting the request.

6. The face authentication method according to claim 5, wherein
the detecting the use or non-use of the second authentication includes detecting the use or non-use based on a command from a user designating the use or non-use of the second authentication.

7. The face authentication method according to claim 5, wherein
the detecting the use or non-use of the second authentication includes detecting the use or non-use based on presence or absence of an interface for acquiring authentication information, to be used in the second authentication, from the authentication target.

8. The face authentication method according to claim 5, wherein
the setting of the threshold includes setting the threshold to be larger than a predetermined value when the second authentication is used.

9. A non-transitory computer-readable medium storing a program comprising instructions for causing a computer to perform processes of:
performing first authentication on a face image of an authentication target based on a threshold;
performing second authentication by an authentication method other than face authentication;
detecting use or non-use of the second authentication;
setting a larger value to the threshold when the second authentication is used, compared with a value to be set when the second authentication is not used; and
performing personal authentication based on a result of the first authentication when the second authentication is not used, while performing personal authentication based on the result of the first authentication and a result of the second authentication when the second authentication is used, with use of the threshold after the setting,
wherein
the setting of the threshold includes, before changing the value of the threshold according to a request from a user, checking use or non-use of the second authentication and checking whether or not the value of the threshold after the change is larger than a predetermined value, and in a case in which the second authentication is used and the value of the threshold after the change is not larger than the predetermined value, rejecting the request.

10. The face authentication apparatus according to claim 1, wherein
in the first authentication, a feature amount of a face extracted from the face image of the authentication target and a feature amount of a face extracted from a reference face image of each registered user are collated with each other, and similarly between the face image and the reference face image is calculated.

11. The face authentication apparatus according to claim 1, wherein
in the setting of the threshold, a value larger than a predetermined value is set to the threshold when the second authentication is used.

12. The face authentication apparatus according to claim 1, wherein
in the setting of the threshold, a value equal to or smaller than a predetermined value is set to the threshold when the second authentication is not used.

13. The face authentication apparatus according to claim 1, wherein
in the first authentication, when the second authentication is used, similarly between the face image of the authentication target and a reference face image of a registered user authenticated by the second authentication is calculated, and the first authentication is performed by comparing the similarity with a threshold.

* * * * *